United States Patent
Merkel et al.

(10) Patent No.: US 8,994,543 B2
(45) Date of Patent: Mar. 31, 2015

(54) DIAGNOSIS AND MAINTENANCE DEVICE FOR A SWITCHGEAR ASSEMBLY AND CORRESPONDING SWITCHGEAR ASSEMBLY

(75) Inventors: Hans-Peter Merkel, Schriesheim (DE); Matthias Forstbach, Einhausen (DE); Ralf Graf, Mannheim (DE)

(73) Assignee: ABB AG, Mannheim (DE)

( * ) Notice: Subject to any disclaimer, the term of this patent is extended or adjusted under 35 U.S.C. 154(b) by 172 days.

(21) Appl. No.: 13/451,079

(22) Filed: Apr. 19, 2012

(65) Prior Publication Data

US 2012/0262300 A1 Oct. 18, 2012

Related U.S. Application Data

(63) Continuation of application No. PCT/EP2010/005822, filed on Sep. 23, 2010.

(30) Foreign Application Priority Data

Oct. 19, 2009 (DE) .......................... 10 2009 049 931

(51) Int. Cl.
*G08B 21/00* (2006.01)
*G05B 19/042* (2006.01)
*G05B 1/00* (2006.01)

(52) U.S. Cl.
CPC .............. *G05B 19/0428* (2013.01); *G05B 1/00* (2013.01); *G05B 2219/24018* (2013.01)
USPC .............................................. 340/644; 700/1

(58) Field of Classification Search
CPC ................................. G05B 1/00; Y04S 10/00
USPC .................. 340/644; 307/112; 700/1, 295, 22
IPC ..................................... G05B 1/00; Y04S 10/00
See application file for complete search history.

(56) References Cited

U.S. PATENT DOCUMENTS

| 2003/0040897 A1* | 2/2003 | Murphy et al. ................. 703/18 |
| 2005/0240807 A1 | 10/2005 | Gebauer et al. |
| 2007/0052298 A1* | 3/2007 | Merkel et al. ................. 307/112 |

FOREIGN PATENT DOCUMENTS

| DE | 10120237 A1 | 10/2002 |
| DE | 10315623 A1 | 10/2004 |
| EP | 1586779 A | 10/2005 |

OTHER PUBLICATIONS

International Search Report (PCT/ISA/210) issued on Jan. 14, 2011, by European Patent Office as the International Searching Authority for International Application No. PCT/EP2010/005822.

*Primary Examiner* — Shirley Lu
(74) *Attorney, Agent, or Firm* — Buchanan Ingersoll & Rooney PC

(57) ABSTRACT

A diagnosis and maintenance device is provided for a switchgear assembly, for example, a low-voltage switchgear assembly. The diagnosis and maintenance device includes a data processing device and at least one first, internal interface device, which is connected to at least one connected and communication-capable apparatus in the switchgear assembly in a communicating manner and polls and/or processes the diagnosis and maintenance information and/or status information of the connected and communication-capable apparatus and provides said information in an accessible manner as usable and/or human-readable information and/or outputs and/or displays said information as usable and/or human-readable information. A switchgear assembly having such a device is also provided.

11 Claims, 1 Drawing Sheet

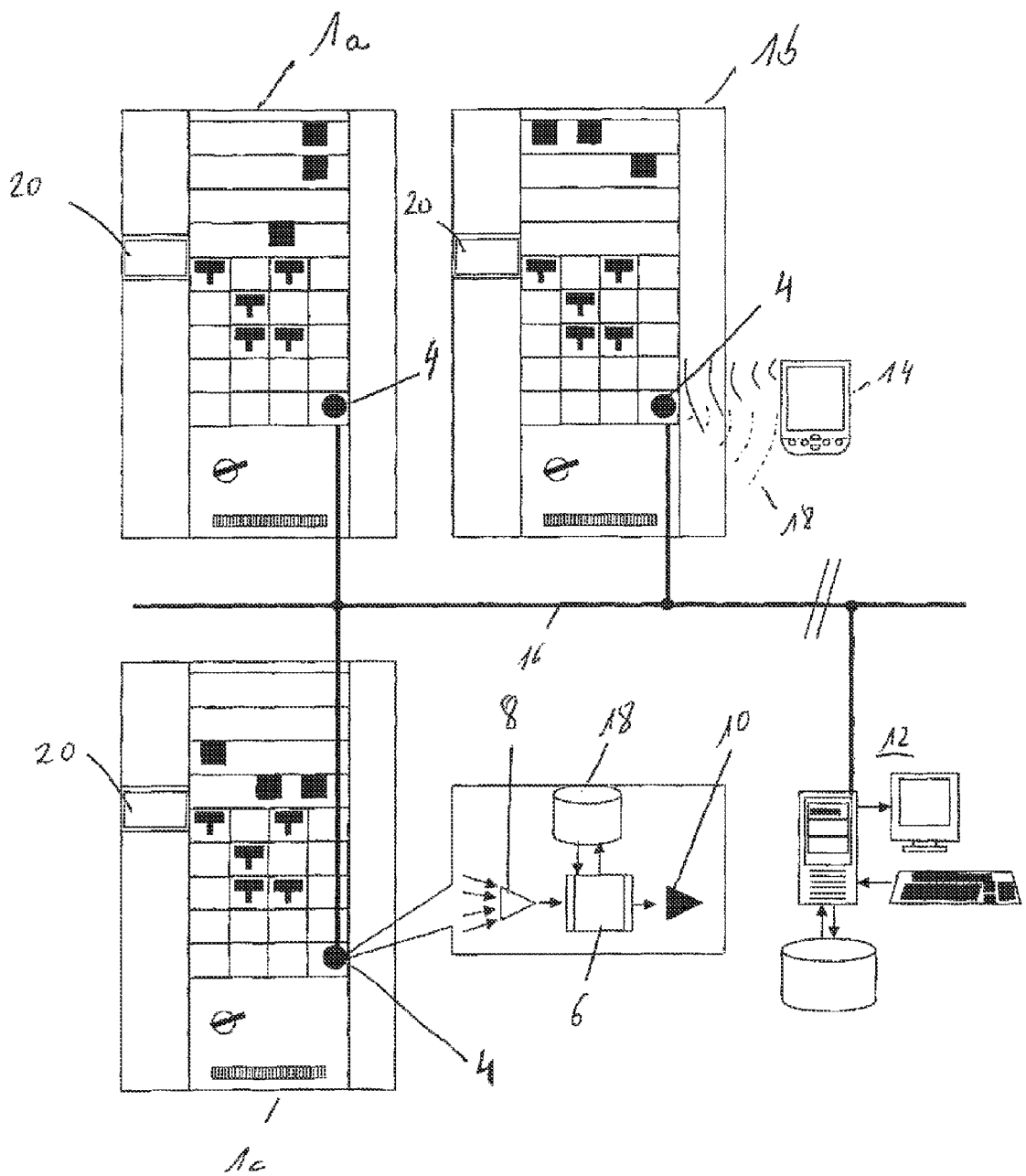

DIAGNOSIS AND MAINTENANCE DEVICE FOR A SWITCHGEAR ASSEMBLY AND CORRESPONDING SWITCHGEAR ASSEMBLY

RELATED APPLICATIONS

This application claims priority as a continuation application under 35 U.S.C. §120 to PCT/EP2010/005822, which was filed as an International Application on Sep. 23, 2010 designating the U.S., and which claims priority to German Application 10 2009 049 931.8 filed in Germany on Oct. 19, 2009. The entire contents of these applications are hereby incorporated by reference in their entireties.

FIELD

The present disclosure relates to a diagnosis and maintenance device for a switchgear assembly, such as a low-voltage switchgear assembly, for example, and to a switchgear assembly, such as a low-voltage switchgear assembly, for example, with such a device.

In known installations and devices, diagnosis and maintenance information is generally integrated in the respective individual apparatus and can be retrieved, output and displayed via a wide variety of communications interfaces and channels externally or by means of systems which are to be installed and set up separately and with comparatively high complexity and corresponding tools, for example, systems for maintenance management, asset management systems or SCADA (Supervisory Control and Data Acquisition) systems outside the switchgear assembly.

The installation and upkeep complexity involved with such systems, for example, from a technical point of view, is comparatively high in this case. Handling and use of these systems is also comparatively complex and generally cannot be managed without special training and specialist technical knowledge.

Retrieval, in particular remote retrieval, which is as simple and efficient as possible of information available or provided in situ in a switchgear assembly, in particular diagnosis and maintenance information relating to the various switchgear assembly components or fittings, has until now not been possible, or only possible to an unsatisfactory extent, however.

SUMMARY

An exemplary embodiment of the present disclosure provides a diagnosis and maintenance device for a switchgear assembly. The exemplary diagnosis and maintenance device includes a data processing device, and at least one first, internal interface device, which has a communications link with at least one connected and communications-ready apparatus in the switchgear assembly. The internal interface device is configured to retrieve at least one of diagnosis and maintenance information and status information of the apparatus in the switchgear assembly. The data processing device is configured to at least one of: condition the retrieved information; provide the retrieved information for callup as at least one of usable and human-readable information; output the retrieved information; and display the retrieved information.

BRIEF DESCRIPTION OF THE DRAWING

Additional refinements, advantages and features of the present disclosure are described in more detail below with reference to exemplary embodiments illustrated in the drawing, in which:

FIG. 1 shows a switchpanel with a plurality of switchgear assemblies each having a diagnosis and maintenance device for a switchgear assembly, according to an exemplary embodiment of the present disclosure.

DETAILED DESCRIPTION

Exemplary embodiments of the present disclosure provide an improved and simplified retrieval of maintenance and diagnosis information available in situ relating to a switchgear assembly.

The diagnosis and maintenance device according to the disclosure for a switchgear assembly, for example, a low-voltage switchgear assembly, includes a data processing device and at least one first, internal interface device, which has a communications link with at least one connected and communications-ready apparatus in the respective switchgear assembly and retrieves the diagnosis and maintenance information and/or status information, for example, the information stored or secured for callup in situ in the respective apparatuses themselves, of the device and/or conditions the information and provides this information for callup as usable and/or human-readable information, for example, in the form of formulated text, tables and/or lists and/or graphically, for example, as a curve diagram, and/or outputs the information and/or displays the information.

This means that control and protection apparatuses, gateways, other controllers of the switchgear assembly, for example, a low voltage switchgear assembly (LV switchgear assembly), have a communications link with this apparatus, the diagnosis and maintenance device, and/or are connected to this apparatus. The diagnosis and maintenance information is retrieved, collected and conditioned and is output and/or displayed, for example, via a man-machine interface (MMI) or a human-machine interface (HMI).

The display or representation can in this case be in list form, in continuous text form, by means of masks and/or with the incorporation of buttons for various types of filters and/or sortings. In order to provide this, the diagnosis and maintenance device can include at least one external interface device for external communication, for example, via Internet and/or Ethernet, with at least one external data processing device, for example, a computer processing device (e.g., computer) such as a desktop computer, a notebook or laptop computer, a PDA or a web-enabled cellular or mobile phone.

In accordance with an exemplary embodiment, the diagnosis and maintenance device includes at least one data store for storing data for diagnosis or maintenance or for additional functions which are accessible and available for callup and capable of being displayed via the respective man-machine interface, for example, in list form, with filters, as text, as a graphical representation, as a curve or the like, in interaction with the data processing device.

In accordance with an exemplary embodiment, the diagnosis and maintenance device is self-configuring.

Furthermore, provision can be made for the diagnosis and maintenance device to be temporarily or permanently or else remotely usable.

The above-described features of the present disclosure facilitate access, for example, remote access, to the information stored or secured in situ, such as diagnosis and/or maintenance information and/or status information relating to a low-voltage switchgear assembly.

By means of a diagnosis and maintenance device as specified above, the respective requirement whereby the respective user or operator needs to be an expert in respect of the respective switchgear assembly, for example, the respective low-voltage switchgear assembly, is now obsolete; even special technical training and/or instruction is no longer required. For instance, it is no longer necessary to read a handbook or to study or to interpret any specific instructions in order to be able to read or understand the maintenance or diagnosis information relating to the respective switchgear assembly, since the diagnosis and maintenance device performs all of these functions and tasks.

In accordance with an exemplary embodiment of the present disclosure, corresponding help text is available or can be called up in the diagnosis and maintenance device in relation to each diagnosis or maintenance alarm and/or notification, and this help text contains and/or provides all of the necessary information/details relating to basic questions, such as What has happened?
Where has it happened?
Who needs to do something?
What needs to be done?
What is the cause?

In accordance with an exemplary embodiment of the present disclosure, provision can be made for hierarchically superordinate systems to be able to gain access to the corresponding information, such as lists or data, for example, automatically or in automated fashion via filter transfer, for example, or via an integrated external OPC interface.

Access is likewise possible via the integrated man-machine interface (MMI), for example, by means of web server technology or by means of other comparable systems and technologies.

Furthermore, an exemplary embodiment of the present disclosure provides a switchgear assembly, for example, a low-voltage switchgear assembly, which includes such a diagnosis and maintenance device of the above-described type.

Additional features and advantageous configurations and developments of the present disclosure will be explained in more detail below with reference to exemplary embodiments illustrated in the drawing.

FIG. 1 shows a switchpanel with three low-voltage switchgear assemblies 1*a*, 1*b*, 1*c*, wherein each of the switchgear assemblies 1*a*, 1*b*, 1*c* has a diagnosis and maintenance device 4 for a switchgear assembly. The respective diagnosis and maintenance device 4 in this case includes at least one data processing device 6, and at least one first interface device 8, which is intended for internal communication and has a communications link with all communications-ready apparatuses and/or withdrawal-part modules which are connected and arranged in the respective switchgear assembly 1*a*, 1*b*, 1*c*, for example, motor control modules, motor starters, modules for power distribution, circuit breakers or the like. In accordance with an exemplary embodiment, the data processing device 6 is configured to retrieve, via the interface device 8, diagnosis and maintenance information, for example, information which is stored or secured in situ in the apparatuses or modules themselves. In addition, the data processing device 6 is configured to condition and/or output the retrieved information as usable and/or human-readable information, for example, as formulated text, tables and/or lists and/or output in graphically conditioned form and/or displayed.

In order to output the conditioned information, in accordance with an exemplary embodiment, at least one further interface device 10 intended for external communication is provided, wherein diagnosis and maintenance information is retrieved from the individual apparatuses and/or modules, collected, conditioned by means of the data processing device 6 of the diagnosis and maintenance device 4 and output and/or displayed by means of the at least one further interface device 10 by means of a man-machine interface (MMI) or human-machine interface (HMI) on at least one further external data processing device, for example, a desktop computer 12 and/or a notebook computer and/or a laptop computer and/or a PDA 14 and/or a cellular or mobile phone.

The internal and external communication can in this case be in wired 16 or wireless 18 form, for example, incorporating and using OPC technology and related protocols or else the Internet and Ethernet technology. The use of known buses and field bus systems, such as Profibus, Modbus, CAN, CANopen, USB, SCSI, Ethernet or the like, for example, and related interfaces and protocols is also conceivable. Corresponding interfaces and tools are provided by the respective interface device 8, 10.

Wireless communication can in this case be realized by means of WLAN, Bluetooth, radio or infrared.

The display or representation and the respective callup of the corresponding information can in this case take place in interaction with the data processing device 6, interface devices 8, 10 and MMI selectively in list form, as continuous text, by means of corresponding masks and/or incorporating functional buttons for various types of filters and/or sortings. Conversion into other data formats or export of the respective information into a predetermined other data format is advantageously also possible.

The first interface device 8 and the data processing device 6 have the capacity, via the corresponding means and devices, to detect and read a large number of different data formats, for example, of the various switchgear assembly modules and/or apparatuses.

Furthermore, the diagnosis and maintenance device 4 includes at least one data store 18 (e.g., a non-transitory computer-readable recording medium such as a non-volatile memory) for storing data for diagnosis or maintenance or for additional functions and program code means, which are accessible and available for callup and can be displayed via the respective man-machine interface and in interaction with the data processing device 6.

In accordance with an exemplary embodiment, the diagnosis and maintenance device 4 can also be designed with withdrawable-part technology in the form of one of the switchgear assembly modules such that it can be inserted temporarily or permanently into the respective switchgear assembly, as required.

Furthermore, the diagnosis and maintenance device 4 can be configured individually and can be adapted and designed, by applying corresponding program code means, for the requirements/application areas of the respective switchgear assembly and the fittings and apparatuses/modules thereof, for example, with specific to specific data formats and communications protocols.

The above-cited disclosure facilitates access, such as remote access, to the information secured or stored in situ, including diagnosis and/or maintenance information relating to a low-voltage switchgear assembly.

Advantageously, provision can be made for hierarchically superordinate systems, for example a corresponding process management system, to have the capacity to access the corresponding information automatically or in automated fashion by means of file transfer, for example, and/or via the at least one integrated external interface device.

In addition, information can be output or access can be gained to the available maintenance and diagnosis information in interaction with an MMI provided directly at the switchgear assembly (in situ) as well, for example a touchscreen 20 or a control panel.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A self-configuring diagnosis and maintenance device for a low voltage switchgear assembly, comprising:
   a data processing device; and
   at least one first, internal interface device, which has a communication link to and connects the diagnosis and maintenance device with at least one of withdrawable control and protection devices, gateways and controllers of the switchgear assembly,
   wherein the internal interface device is configured to retrieve diagnosis, maintenance and status information which are stored or secured for callup in situ in at least one of the of the apparatus in the switchgear assembly, and
   wherein the data processing device is configured to condition the retrieved information, and to at least one of:
      provide the retrieved information for callup as at least one of usable and human-readable information;
      output the retrieved information; and
      display the retrieved information,
   to facilitate remote access to the information stored or secured in situ.

2. The device as claimed in claim 1, wherein the data processing device is configured to retrieve, via the interface device, diagnosis and maintenance information, and collect and condition the retrieved diagnosis and maintenance information.

3. The device as claimed in claim 1, comprising:
   at least one further, external interface device configured to provide external communication, via at least one of Internet and Ethernet, with at least one external data processing device.

4. The device as claimed in claim 1, comprising:
   at least one data store configured to store data for at least one of diagnosis, maintenance and status analysis.

5. A switchgear assembly comprising a diagnosis and maintenance device as claimed in claim 1.

6. The device as claimed in claim 1, comprising:
   at least one further, external interface device configured to provide external communication, via at least one of Internet and Ethernet, with at least one external data processing device.

7. The device as claimed in claim 2, comprising:
   at least one further, external interface device configured to provide external communication, via at least one of Internet and Ethernet, with at least one external data processing device.

8. The device as claimed in claim 6, comprising:
   at least one data store configured to store data for at least one of diagnosis, maintenance and status analysis.

9. A switchgear assembly comprising a diagnosis and maintenance device as claimed in claim 8.

10. The device as claimed in claim 1, wherein:
    the device is configured for a low voltage switchgear assembly, which is designed with withdrawable-part technology in a form of one of the switchgear assembly modules to be inserted temporarily or permanently into the switchgear assembly;
    the at least one first, internal interface device has a communications link with withdrawal-part modules which are connected and arranged in the switchgear assembly; and
    wherein the data processing device is configured to at least one of:
       condition the retrieved information;
       provide the retrieved information for callup as at least one of usable and human-readable information;
       output the retrieved information; and
       display the retrieved information to facilitate remote access to the information stored or secured in situ.

11. The device as claimed in claim 10, wherein the withdrawal-part modules include at least one of motor control modules, motor starters, modules for power distribution, and circuit breakers in the switchgear assembly.

* * * * *